(12) United States Patent
Washida et al.

(10) Patent No.: US 11,824,188 B2
(45) Date of Patent: *Nov. 21, 2023

(54) POSITIVE ELECTRODE ACTIVE MATERIAL FOR ALL-SOLID-STATE LITHIUM SECONDARY BATTERIES

(71) Applicant: Mitsui Mining & Smelting Co., Ltd., Tokyo (JP)

(72) Inventors: Daisuke Washida, Ageo (JP); Hitohiko Ide, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 16/638,627

(22) PCT Filed: Aug. 10, 2018

(86) PCT No.: PCT/JP2018/030030
§ 371 (c)(1),
(2) Date: Feb. 12, 2020

(87) PCT Pub. No.: WO2019/035418
PCT Pub. Date: Feb. 21, 2019

(65) Prior Publication Data
US 2021/0135199 A1  May 6, 2021

(30) Foreign Application Priority Data
Aug. 14, 2017 (JP) .................................. 2017-156414

(51) Int. Cl.
*H01M 4/36* (2006.01)
*H01M 10/0525* (2010.01)
(Continued)

(52) U.S. Cl.
CPC .......... *H01M 4/366* (2013.01); *H01M 4/485* (2013.01); *H01M 4/628* (2013.01);
(Continued)

(58) Field of Classification Search
None
See application file for complete search history.

(56) References Cited

U.S. PATENT DOCUMENTS 6,337,158 B1  1/2002  Nakajima et al.
8,114,309 B2  2/2012  Kajiya et al.
(Continued)

FOREIGN PATENT DOCUMENTS

| CN | 102149641 A | 8/2011 |
|---|---|---|
| CN | 102856542 A | 1/2013 |

(Continued)

OTHER PUBLICATIONS

Mao et al., "Effect of Chromium and Niobium Doping on the Morphology and Electrochemical Performance of High-Voltage Spinel LiNi0.5Mn1.5O4 Cathode Material", ACS Applied Materials & Interfaces, 2016, pp. 9116-9124, vol. 8.

(Continued)

*Primary Examiner* — Zhongqing Wei
(74) *Attorney, Agent, or Firm* — The Webb Law Firm (57) ABSTRACT

A positive electrode active material for an all-solid-state lithium secondary battery, which is capable of improving the rate characteristics, the cycle characteristics, and the initial charge and discharge efficiency even in the case where a sulfide-based solid electrolyte is used, wherein the surface of a lithium-containing composite oxide, referred to as present core particles, is coated with a compound, referred to as, LiAO compound, containing Li, A, where A represents one or more elements selected from the group consisting of Ti, (Continued)

Zr, Ta, Nb, Zn, W, and Al, and O; and a halogen is present on the surface of the present core particles.

14 Claims, 1 Drawing Sheet

(51) Int. Cl.
  *H01M 10/0562* (2010.01)
  *H01M 4/485* (2010.01)
  *H01M 4/62* (2006.01)
  *H01M 4/02* (2006.01)

(52) U.S. Cl.
  CPC ... *H01M 10/0525* (2013.01); *H01M 10/0562* (2013.01); *H01M 2004/028* (2013.01); *H01M 2300/0068* (2013.01)

(56) References Cited

U.S. PATENT DOCUMENTS

| | | |
|---|---|---|
| 8,852,811 B2 | 10/2014 | Koga et al. |
| 9,240,595 B2 | 1/2016 | Kagei et al. |
| 9,478,808 B2 | 10/2016 | Takei et al. |
| 9,537,140 B2 | 1/2017 | Shibamura et al. |
| 2005/0271943 A1 | 12/2005 | Park et al. |
| 2009/0081554 A1 | 3/2009 | Takada et al. |
| 2009/0289218 A1 | 11/2009 | Kajiya et al. |
| 2010/0173199 A1 | 7/2010 | Hiraki et al. |
| 2011/0210287 A1 | 9/2011 | Koga et al. |
| 2012/0028128 A1 | 2/2012 | Seino et al. |
| 2012/0094185 A1* | 4/2012 | Tsuchida ........... H01M 10/0562 429/304 |
| 2014/0034872 A1 | 2/2014 | Watanabe et al. |
| 2014/0065298 A1 | 3/2014 | Yanagisawa et al. |
| 2014/0162119 A1 | 6/2014 | Takei et al. |
| 2014/0252268 A1 | 9/2014 | Kagei et al. |
| 2014/0287324 A1 | 9/2014 | Tsuchida et al. |
| 2015/0104644 A1 | 4/2015 | Iwata et al. |
| 2015/0132651 A1 | 5/2015 | Lee et al. |
| 2015/0147652 A1 | 5/2015 | Shibamura et al. |
| 2015/0221978 A1 | 8/2015 | Murota et al. |
| 2015/0243984 A1 | 8/2015 | Kase et al. |
| 2015/0255791 A1 | 9/2015 | Kagei et al. |
| 2015/0263341 A1 | 9/2015 | Kato et al. |
| 2015/0270537 A1 | 9/2015 | Kato et al. |
| 2015/0287985 A1 | 10/2015 | Miki |
| 2016/0093882 A1 | 3/2016 | Kagei et al. |
| 2016/0111716 A1 | 4/2016 | Kagei et al. |
| 2016/0156033 A1 | 6/2016 | Fujii et al. |
| 2016/0211519 A1 | 7/2016 | Uchiyama et al. |
| 2016/0268595 A1 | 9/2016 | Miki |
| 2016/0351943 A1 | 12/2016 | Albano et al. |
| 2016/0372749 A1 | 12/2016 | Iida et al. |
| 2017/0033354 A1 | 2/2017 | Ruan et al. |
| 2017/0207456 A1 | 7/2017 | Liu et al. |
| 2017/0309908 A1 | 10/2017 | Mitsumoto et al. |
| 2018/0323431 A1 | 11/2018 | Kase et al. |
| 2019/0051900 A1 | 2/2019 | Yamaguchi et al. |

FOREIGN PATENT DOCUMENTS

| | | |
|---|---|---|
| CN | 103872311 A | 6/2014 |
| CN | 104157902 A | 11/2014 |
| CN | 104661963 A | 5/2015 |
| CN | 105378987 A | 3/2016 |
| CN | 105428631 A | 3/2016 |
| CN | 105493318 A | 4/2016 |
| EP | 2172996 A1 | 4/2010 |
| EP | 2869369 A1 | 5/2015 |
| JP | H8167425 A | 6/1996 |
| JP | H1173962 A | 3/1999 |
| JP | H11307092 A | 11/1999 |
| JP | 2000235857 A | 8/2000 |
| JP | 200152733 A | 2/2001 |
| JP | 2002373643 A | 12/2002 |
| JP | 2003197194 A | 7/2003 |
| JP | 2008147068 A | 6/2008 |
| JP | 2009302067 A | 12/2009 |
| JP | 2010282948 A | 12/2010 |
| JP | 2012216548 A | 11/2012 |
| JP | 2012234648 A | 11/2012 |
| JP | 2014130851 A | 7/2014 |
| JP | 2014139119 A | 7/2014 |
| JP | 2014166951 A | 9/2014 |
| JP | 201565007 A | 4/2015 |
| JP | 6752890 B2 | 5/2015 |
| JP | 2015130273 A | 7/2015 |
| JP | 2015140292 A | 8/2015 |
| JP | 2015140297 A | 8/2015 |
| JP | 2015527714 A | 9/2015 |
| JP | 2015179616 A | 10/2015 |
| JP | 201639062 A | 3/2016 |
| JP | 2016170973 A | 9/2016 |
| KR | 1020120016079 A | 2/2012 |
| KR | 1020150115673 A | 10/2015 |
| WO | 2007004590 A1 | 1/2007 |
| WO | 2013073214 A1 | 5/2013 |
| WO | 2014104234 A1 | 7/2014 |
| WO | 2014185547 A1 | 11/2014 |
| WO | 2014185548 A1 | 11/2014 |
| WO | 2016175311 A1 | 3/2016 |
| WO | 2017150504 A1 | 9/2017 |

OTHER PUBLICATIONS

"Lithium Nickel Cobalt Aluminum Oxide", Ministry of Industry and Information Technology of the People's Republic of China, Jul. 11, 2016, 23 pages.

* cited by examiner

POSITIVE ELECTRODE ACTIVE MATERIAL FOR ALL-SOLID-STATE LITHIUM SECONDARY BATTERIES

CROSS-REFERENCE TO RELATED APPLICATIONS

This application is the United States national phase of International Application No. PCT/JP2018/030030 filed Aug. 10, 2018, and claims priority to Japanese Patent Application No. 2017-156414 filed Aug. 14, 2017, the disclosures of which are hereby incorporated by reference in their entirety.

BACKGROUND OF THE INVENTION

Field of the Invention

The present invention relates to a positive electrode active material that can be suitably used for a lithium secondary battery using a solid electrolyte (referred to as "all-solid-state lithium secondary battery").

Description of the Related Art

The solid electrolyte used for an all-solid-state lithium secondary battery has been demanded to have high ionic conductivity as high as possible and to be stable chemically and electrochemically. For example, lithium halide, lithium nitride, lithium acid salt, and derivatives thereof are known as material candidates for the solid electrolyte.

In the all-solid-state lithium secondary battery, it has been proposed to improve the interfacial state, as demanded to form a satisfactory interface between a solid electrolyte and a positive electrode active material, in order to enhance the conductivity of lithium ions.

For example, with regard to the positive electrode active material that can be used for an all-solid-state lithium secondary battery, International Publication No. WO 2007/4590 and Japanese Patent Laid-Open No. 2016-170973 disclose that a $LiNbO_3$ coating layer is formed on the surface of the positive electrode active material, and by using such a positive electrode active material, the output characteristics of the all-solid-state battery can be improved by interposing a lithium ion-conducting oxide layer on the interface between the positive electrode active material and a solid electrolyte.

Patent Document 1: International Publication No. WO 2007/4590
Patent Document 2: Japanese Patent Laid-Open No. 2016-170973

SUMMARY OF THE INVENTION

As described above, when a lithium ion-conducting oxide layer such as $LiNbO_3$ is formed on the surface of a positive electrode active material (also referred to as "positive electrode active material core particles"), and the lithium ion-conducting oxide layer is interposed on the interface between the positive electrode active material and the solid electrolyte, a satisfactory interface is constructed, and the battery capacity can be increased.

However, it has been found that when a sulfide-based solid electrolyte containing sulfur (S) is used as the solid electrolyte, oxygen (O) in the lithium ion-conducting oxide layer such as $LiNbO_3$ or in the positive electrode active material core particles and sulfur (S) in the sulfide-based solid electrolyte may cause an exchange reaction to deteriorate the interface, and the battery characteristics such as rate characteristics and cycle characteristics may be reduced. Particularly, it has been found that the exchange reaction between oxygen (O) and sulfur (S) as described above causes an irreversible capacity, thereby reducing the initial charge and discharge efficiency.

Thus, the present invention relates to a positive electrode active material for an all-solid-state lithium secondary battery in which the surface of the core particles is coated with a lithium ion-conducting oxide such as $LiNbO_3$; and provides a novel positive electrode active material for an all-solid-state lithium secondary batteries, which is capable of improving the rate characteristics, the cycle characteristics, and the initial charge and discharge efficiency even in the case where a sulfide-based solid electrolyte containing sulfur (S) is used.

The present invention proposes a positive electrode active material for an all-solid-state lithium secondary battery, which is a positive electrode active material to be used for an all-solid-state lithium secondary battery, in which the surface of a lithium-containing composite oxide (referred to as "present core particles") is coated with a compound (referred to as "LiAO compound") containing Li, A (A represents one or two or more elements selected from the group consisting of Ti, Zr, Ta, Nb, Zn, W, and Al), and O; and a halogen is present on the surface of the present core particles.

The positive electrode active material for an all-solid-state lithium secondary battery proposed by the present invention is able to enhance the rate characteristic by reducing the interfacial resistance since the surface of the present core particles is coated with the LiAO compound. In addition, by the presence of a halogen on the surface of the present core particles, even when used in combination with a sulfide-based solid electrolyte, the initial charge and discharge efficiency and the cycle characteristics can be enhanced by oxygen compensation on the surface region, and by the effect of suppressing the exchange reaction between oxygen (O) in the LiAO compound or in the core particles and sulfur (S) in the sulfide-based solid electrolyte.

DESCRIPTION OF THE INVENTION

Next, the present invention will be described based on exemplary embodiments for carrying out the present invention. However, the present invention is not limited to the embodiments described below.

[Present Positive Electrode Active Material]

The positive electrode active material according to an example of the embodiments of the present invention is a positive electrode active material for an all-solid-state lithium secondary battery (referred to as "present positive electrode active material"), which is a positive electrode active material to be used for an all-solid-state lithium secondary battery using a solid electrolyte, in which a compound (referred to as "LiAO compound") containing Li, A (A represents one or two or more elements selected from the group consisting of Ti, Zr, Ta, Nb, Zn, W, and Al), and O; and a halogen are present on the surface of a lithium-containing composite oxide.

<Present Core Particles>

The lithium-containing composite oxide in the present core particles, which is used as a positive electrode active material for a lithium secondary battery, can be suitably used. For example, the lithium-containing composite oxide may be any one or a combination of two or more of a lithium-containing composite oxide having a layered rock salt structure represented by a general formula: $LiMO_2$ (M represents a metal element), a lithium-containing composite oxide having a spinel structure represented by a general formula: $LiM_2O_4$, and a lithium-containing composite oxide having an olivine structure represented by a general formula: $LiMPO_4$ (M represents a metal element) or $LiMSiO_4$ (M represents a metal element). However, the lithium-containing composite oxide described in the present invention is not limited to these.

Particularly, the lithium-containing composite oxide having a layered rock salt structure is likely to release oxygen (O) from the crystal structure at the time of repeated charging and discharging or at the end of charging, so that the exchange reaction between the oxygen (O) and sulfur (S) in the sulfide-based solid electrolyte can be suppressed, and further effects can be obtained by the present invention. Therefore, as the lithium-containing composite oxide constituting the present core particles, the lithium-containing composite oxide having a layered rock salt structure is more preferred.

Examples of the lithium-containing composite oxide having a layered rock salt structure may include a lithium-containing composite oxide represented by a general formula: $LiMO_2$ (M represents a metal element), such as $LiCoO_2$, $LiNiO_2$, $LiCo_{1/3}Ni_{1/3}Mn_{1/3}O_2$, $LiCo_{0.5}Ni_{0.5}O_2$, or $LiNi_{0.7}Co_{0.2}Mn_{0.1}O_2$.

Among them, the lithium-containing composite oxide having a layered structure represented by a general formula (1): $Li_{1+x}M_{1-x}O_2$ (M represents a metal element) can be cited.

From the viewpoint of stabilizing the crystal structure, the value of "1+x" in the above formula (1) is preferably 1.00 to 1.15, more preferably 1.01 or more or 1.10 or less, even more preferably 1.02 or more or 1.07 or less.

The "M" in the above formula (1) preferably represents three elements of Mn, Co, and Ni, or four or more elements including the three elements and at least one or more elements among transition elements from Group 3 elements to Group 11 elements in the periodic table and typical elements up to the third cycle in the periodic table.

Here, examples of the transition elements from Group 3 elements to Group 11 elements in the periodic table and the typical elements up to the third cycle in the periodic table may include Al, V, Fe, Ti, Mg, Cr, Ga, In, Cu, Zn, Nb, Zr, Mo, W, Ta, and Re.

Accordingly, for example, the "M" may be any three or more elements among Mn, Co, Ni, Al, V, Fe, Ti, Mg, Cr, Ga, In, Cu, Zn, Nb, Zr, Mo, W, Ta, and Re; may be constituted by only three elements of Mn, Co, and Ni; may include one or more of other elements in addition to the three elements; or may have other configurations. Such examples may include the case of containing Mn, Co, Ni, and Al; the case of containing Mn, Co, Ni, Al, and Mg; and the case of containing Mn, Co, Ni, Al, Ti, and Mg.

The "1−x" in the above general formula (1) means the sum of composition ratios of elements constituting M. For example, in the case where the M element is constituted by two kinds of elements, the "1−x" represents the sum of composition ratios of the two kinds of elements.

Also, in the above general formula (1), the atomic ratio of the amount of oxygen is described as "2" for convenience, but may have some non-stoichiometry.

<Surface of Present Core Particles>

It is preferable that the surface of the present core particles is coated with the LiAO compound, and at least halogen, optionally lithium carbonate and other substances are present on the surface of the present core particles.

(LiAO Compound)

By coating the surface of the present core particles with the LiAO compound, lithium ion conductivity can be improved, the interfacial resistance between the positive electrode active material and the solid electrolyte can be reduced, and the rate characteristics can be enhanced.

The state in which "the surface of the present core particles is coated with the LiAO compound" means that the LiAO compound may be present as particles, may be present as aggregated particles formed by aggregating particles, or may be present by forming a layer, on the surface of the present core particles.

Here, the "present by forming a layer" means a state in which the LiAO compound is present with a thickness.

Figure 1:
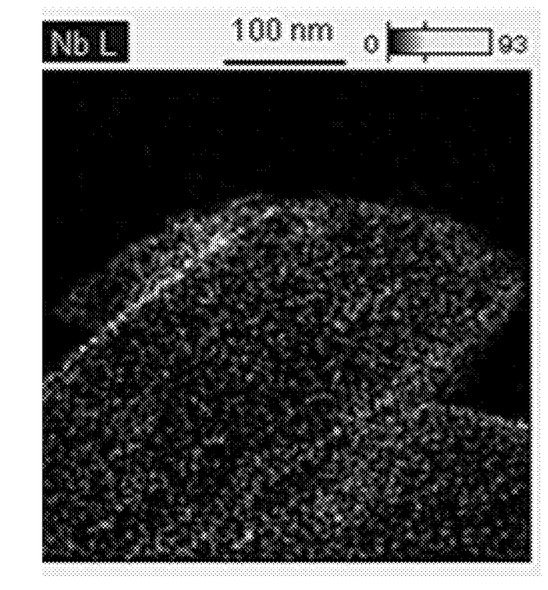
FIG. 1 is a result of observing a sample obtained in Example 1 by a scanning-type transmission electron microscope (STEM) in combination with an energy dispersive X-ray spectrometry (EDS), and performing element mapping on the Nb element.

When the LiAO compound forms a layer, the thickness of the layer is preferably 0.5 to 200 nm, more preferably 0.7 nm or more or 100 nm or less, even more preferably 1 nm or more or 50 nm or less, still more preferably 25 nm or less. By setting the thickness within the above range, the layer can be functioned as a satisfactory lithium ion conducting layer with small interfacial resistance. The thickness of the layer can be measured, for example, by a scanning-type transmission electron microscope (STEM). In addition, it can be observed and measured in combination with an energy dispersive X-ray spectrometry (EDS) as necessary. As an example, the sample obtained in Example 1 is observed by the scanning-type transmission electron microscope (STEM) in combination with the energy dispersive X-ray spectrometry (EDS), and the result of element mapping of the Nb element as an A element is shown in FIG. 1. It can be confirmed that the LiAO compound forms a layer having a thickness of about 1 to 25 nm.

There may be areas where no LiAO compound is present on a part of area or several partial areas of the surface of the present core particles. Particularly, it is preferable that the LiAO compound coats 30% or more of the entire surface area of the present core particles, more preferably 40% or more thereof, even more preferably 50% or more thereof.

Here, whether or not the surface of the present core particles is coated with the LiAO compound can be confirmed by observing the surface of the present core particles, for example, by the scanning type transmission electron microscope (STEM) and in combination with the energy dispersive X-ray spectrometry (EDS) as necessary, or by Auger electron spectroscopy. The thickness of the LiAO compound which coats the surface of the present core particles may not be uniform.

The LiAO compound is preferably amorphous.

When the LiAO compound is amorphous, the LiAO compound is present as a buffer layer between the positive electrode active material and the solid electrolyte, and the interfacial resistance can be reduced accordingly.

Whether the compound coating the surface of the present core particles is crystalline or amorphous can be judged by confirming whether a halo pattern can be obtained by selected area electron diffraction. Here, the halo pattern refers to a low-angle and broad diffraction pattern having no clear diffraction peak.

The composition of each element in the LiAO compound can be represented by, for example, $Li_xAO_y$, when the A element is at least one element of Ta and Nb. Typically, $LiAO_3$, that is, the composition when x=1 and y=3, or $Li_3AO_4$, that is, the composition when x=3 and y=4 can be assumed.

However, the parameters x and y in the formula can take arbitrary values in ranges according to valences of the elements. Particularly, a composition (1<x) in which Li is contained in excess of 1 mol relative to 1 mol of the A element is more preferred. With the composition, the generation of the compound of A and O can be suppressed, and the interfacial resistance can be effectively reduced.

Examples of the method for satisfying 1<x in the amorphous compound of $Li_xAO_y$ may include a method in which the blending amount of the lithium raw material with respect to the A element raw material is adjusted such that the amount of Li becomes excessive as compared with a composition assumed to be generated of lithium carbonate, for example, a stoichiometric composition ratio of $LiAO_3$.

However, when an excessive amount of Li is merely added, lithium carbonate is generated on the surface of the present positive electrode active material due to the excessive amount of Li, which causes a resistance, and instead, the rate characteristics and the cycle characteristics tend to deteriorate. Therefore, considering the generation of lithium carbonate, it is preferable to adjust the blending amount of the A element raw material and the blending amount of the lithium raw material such that the amorphous compound has a predetermined composition.

From such a viewpoint, the molar ratio (Li/A) of the amount of Li with respect to the amount of the A element present on the surface of the present core particles, as obtained by X-ray photoelectron spectroscopy (XPS), is preferably 1.5 to 33.3. Among them, it is more preferably more than 1.5 or 15 or less, even more preferably more than 2.0 or 10.0 or less.

Here, the amount of Li in the molar ratio (Li/A) is a value including Li derived from the lithium carbonate and Li derived from the present core particles themselves.

In order to control the ratio of Li to the A element present on the surface of the present core particles within the above range, it is preferable to adjust the blending amount of the A element raw material and the blending amount of the lithium raw material such that the molar ratio (Li/A) falls within the above range while considering the amount of Li derived from the lithium carbonate to be generated on the surface of the present core particles. By doing so, the rate characteristics can be improved. However, the present invention is not limited to this method.

(Halogen (Ha))

The present positive electrode active material is characterized in that a halogen is present on the surface of the present core particles.

When a halogen is present on the surface of the core particles, in the case of using the present positive electrode active material in combination with a sulfide-based solid electrolyte, the halogen present on the surface of the present core particles compensates for oxygen (O) on the surface region, and suppresses the exchange reaction between oxygen (O) in the LiAO compound or in the core particles and sulfur (S) in the sulfide-based solid electrolyte, so that the initial charge and discharge efficiency and the cycle characteristics can be enhanced.

Here, the halogen means any element of fluorine (F), chlorine (Cl), bromine (Br), and iodine (I).

The halogen present on the surface of the present core particles may be one element or a combination of two or more elements. From the viewpoint of suppressing the generation of lithium halide that serves as resistance, chlorine (Cl) and bromine (Br) are preferable, and from the viewpoint of further enhancing the effect of oxygen compensation, fluorine (F) is preferable.

The halogen (Ha) present on the surface of the present core particles may be solid-dissolved in the LiAO compound, or may be present in the state of a halogen compound separately from the LiAO compound.

The concentration of the halogen present on the surface of the core particles is preferably 0.00075 or more as the concentration of halogen measured by time-of-flight secondary ion mass spectroscopy (TOF-SIMS).

The halogen concentration is preferably 0.00075 or more since the exchange reaction between oxygen (O) in the LiAO compound or in the core particles and sulfur (S) in the sulfide-based solid electrolyte can be suppressed. On the other hand, although there is no particular upper limit, empirically, it is preferably, for example, 0.155 or less since the lithium ion conductivity is not impaired on the surface of the present core particles.

From such a viewpoint, the halogen concentration measured by time-of-flight secondary ion mass spectroscopy (TOF-SIMS), that is, the ratio ($Ha^-$/total) of count numbers ($Ha^-$) of secondary ion species for halogen ions with respect to the sum (total) of all count numbers of secondary ions collected from the surface of the present core particles, as measured under the condition of negative secondary ion polarity using TOF-SIMS, is preferably 0.00075 or more, more preferably 0.0015 or more, even more preferably 0.0075 or more, still more preferably 0.010 or more.

Also, the mass ratio (Ha/A) of the halogen (Ha) amount (ppm) measured by ion chromatography after thermally decomposing the positive electrode active material with respect to the above A element amount (wt %) measured by inductively coupled plasma (ICP) emission spectroscopy after completely dissolving the positive electrode active material is preferably $0.5 \times 10^{-4}$ or more.

The mass ratio (Ha/A) of the halogen amount with respect to the A element amount is preferably $0.5 \times 10^{-4}$ or more since the exchange reaction between oxygen (O) in the LiAO compound or in the core particles and sulfur (S) in the sulfide-based solid electrolyte can be suppressed. On the other hand, although there is no particular upper limit, empirically it is preferably, for example, $3,000 \times 10^{-4}$ or less since the lithium ion conductivity is not impaired on the surface of the present core particles.

From such a viewpoint, the mass ratio (Ha/A) of the halogen amount with respect to the A element amount is preferably $0.5 \times 10^{-4}$ or more, more preferably $1.5 \times 10^{-4}$ or more, even more preferably $5.0 \times 10^{-4}$ or more, still more preferably $70.0 \times 10^{-4}$ or more, furthermore preferably $150.0 \times 10^{-4}$ or more.

The molar ratio ((Ha/A)×100) of the halogen (Ha) amount with respect to the A element amount present on the surface of the present positive electrode active material (particles), as obtained by X-ray photoelectron spectroscopy (XPS), is preferably 1.1 or more.

The molar ratio ((Ha/A)×100) of the halogen amount with respect to the A element amount present on the surface of the present positive electrode active material (particles) is preferably 1.1 or more since the exchange reaction between oxygen (O) in the LiAO compound or in the core particles and sulfur (S) in the sulfide-based solid electrolyte can be suppressed. On the other hand, although there is no particular upper limit, empirically the molar ratio ((Ha/A)×100) is preferably 195 or less since the lithium ion conductivity is not impaired on the surface of the present core particles.

From such a viewpoint, the molar ratio ((Ha/A)×100) of the halogen amount with respect to the A element amount present on the surface of the present positive electrode active material (particles), as obtained by X-ray photoelectron spectroscopy (XPS), is preferably 1.1 or more, more preferably 3.3 or more, even more preferably 5.5 or more, still more preferably 11.0 or more.

(Lithium Carbonate)

When the amount of lithium carbonate present on the surface of the present core particles is large, the resistance is generated and the lithium ion conductivity is lowered. Thus, the content of the lithium carbonate with respect to the present positive electrode active material is preferably less than 2.5 wt %, more preferably less than 2.0 wt %, even more preferably less than 1.85 wt %.

In order to reduce the amount of the lithium carbonate present on the surface of the present core particles, for example, it is preferable to calcine in an atmosphere not containing carbon dioxide such as a nitrogen atmosphere or an oxygen atmosphere, and more preferable to perform hydrolyzing while irradiating with ultrasonic waves.

[Method for Producing Present Positive Electrode Active Material]

The present positive electrode active material can be produced, for example, in such a manner that a water-soluble A element salt containing halogen and lithium hydroxide are dissolved in water to prepare a surface treatment liquid; the present core particles (lithium-containing composite oxide) is introduced into the surface treatment liquid and kneaded to form a slurry; and the slurry is dried and calcined.

Examples of the water-soluble salt containing A element may include chloride containing A element, potassium fluoride containing A element, ammonium oxalate containing A element, and ammonium peroxoacid containing A element. Among them, from the viewpoint of suppressing the residual of the carbon-based impurities, ammonium peroxoacid containing A element is preferable.

However, the method for producing the present positive electrode active material is not limited to this method. For example, a tumbling fluidized coating method (sol-gel method), a mechano-fusion method, a CVD method, a PVD method, and the like are capable of producing the present positive electrode active material by adjusting the conditions.

In the above production method, the present core particles are introduced into the surface treatment liquid to form a slurry, and the slurry is dried and calcined to form a LiAO compound; and the halogen (Ha) and the LiAO compound can be adhered on the surface of the core particles.

In so doing, when the calcining temperature is 200° C. or more, the role can be achieved and in addition, the amount of lithium carbonate present on the surface of the positive electrode active material can be reduced. Meanwhile, the calcining temperature is preferably 500° C. or less since the LiAO compound can be made amorphous.

Therefore, the calcining temperature is preferably 200 to 500° C., more preferably 250° C. or more or 400° C. or less.

In addition, the calcining atmosphere is preferably an oxygen-containing atmosphere such as air. From the viewpoint of reducing the amount of lithium carbonate present on the surface of the positive electrode active material, it is preferable to calcine under an atmosphere not containing carbon dioxide, such as a nitrogen atmosphere or an oxygen atmosphere.

[Application of Present Positive Electrode Active Material]

The present positive electrode active material can be suitably utilized as it is, or as a positive electrode active material for an all-solid-state lithium secondary battery using a solid electrolyte after being crushed and classified as necessary.

Here, the present positive electrode active material only may be used as a positive electrode active material for an all-solid-state lithium secondary battery, or may be used by mixing with the other positive electrode active material.

As the other positive electrode active material, a positive electrode active material currently used for lithium secondary batteries can be arbitrarily selected. However, when the present positive electrode active material is used by mixing with the other positive electrode active material, the present positive electrode active material is preferably mixed so as to occupy 50 wt % or more, more preferably 60 wt % or more, even more preferably 70 wt % or more.

The solid electrolyte is not particularly limited, but a sulfide-based solid electrolyte containing sulfur (S) is preferably used. When the present positive electrode active material is used in combination with the sulfide-based solid electrolyte, the halogen present on the surface of the present core particles is able to suppress the exchange reaction between the oxygen (O) in the LiAO compound or in the core particles, and the sulfur (S) in the sulfide-based solid electrolyte, thereby suppressing the deterioration of the interface. Thus, the rate characteristics, the cycle characteristics, and the initial charge and discharge efficiency can be enhanced, and the effect by the present invention can be further enjoyed.

The sulfide-based solid electrolyte may be any of a crystalline material, glass ceramic, and glass. Examples thereof may include a compound represented by $Li_3PS_4$, $Li_{10}GeP_2S_{12}$, $Li_{3.25}Ge_{0.25}P_{0.75}S_4$, $30Li_2S.6B_2S_3.44LiI$, $63Li_2S.36SiS_2.Li_3PO_4$, $57Li_2S.38SiS_2.5Li_4Si_4$, $70Li_2S.30P_2S_5$, $50Li_2S.50GeS_2$, $Li_7P_3S_{11}$, $Li_{3.25}P_{0.95}S_4$, $Li_{7-x}PS_{6-x}Ha_x$ ($0.2<x<1.8$), or the like. However, the present invention is not limited to these compounds.

Examples of the negative electrode active material may include a negative electrode active material containing carbon such as artificial graphite, natural graphite, or non-graphitizing carbon (hard carbon). Also, silicon or tin which is promising as a high-capacity material can be used as an active material.

Examples of the shape of the all-solid-state lithium secondary battery may include a laminate-type, a cylindrical-type, and a square-type.

For example, by forming a layer composed of a solid electrolyte between the positive electrode and the negative electrode, the assembling to constitute the all-solid-state lithium secondary battery can be performed, for example, in a dry room.

[Explanation of Other Terms]

In the case of being expressed as the term "X to Y" (X and Y are arbitrary numbers) in the present description, unless otherwise stated, the term includes the meaning of "preferably more than X" or "preferably less than Y" along with the meaning "not less than X and not more than Y".

Further, in the case of being expressed as the term "X or more" (X is an arbitrary number) or the term "Y or less" (Y is an arbitrary number), the term also includes the intention of being "preferably more than X" or "preferably less than Y".

EXAMPLES

Next, the present invention will be described further based on Examples and Comparative Example. However, the present invention is not limited to the following Examples.

Example 1

5 g of ammonium peroxoniobate containing fluorine as an impurity and 2.3 g of lithium hydroxide were dissolved in 100 mL of ion-exchanged water to prepare a surface treatment liquid.

20 g of a lithium-containing composite oxide ($LiCo_{1/3}Ni_{1/3}Mn_{1/3}O_2$) was introduced in 33 mL of the surface treatment liquid to form a slurry, and the slurry was stirred for 1 hour. Thereafter, it was dried at 130° C. for 90 minutes, crushed with a mortar, and calcined at 350° C. in the air to obtain a positive electrode active material (sample). The average particle diameter (D50) of the sample determined by a laser diffraction scattering-type particle size distribution measurement method was 2.5 μm.

The resulting positive electrode active material (sample) was observed with STEM and analyzed by XPS. Whether the sample was coated with a LiNbO compound containing Li, Nb, and O was determined by confirming the presence or absence of the LiNbO compound surface layer. The results are shown in Table 1.

Also, on the LiNbO compound surface layer, a halo pattern was observed as described later to determine the crystallinity of the LiNbO compound, that is, whether the LiNbO compound is crystalline or amorphous. The results are shown in Table 1.

Example 2

A positive electrode active material (sample) was obtained in the same manner as in Example 1 except that a washing treatment was performed in order to reduce the fluorine content of ammonium peroxoniobate containing fluorine in Example 1.

Then, the resulting positive electrode active material (sample) was observed, analyzed, confirmed, and determined in the same manner as in Example 1. The results are shown in Table 1.

Example 3

A positive electrode active material (sample) was obtained in the same manner as in Example 1 except that a washing treatment was repeatedly performed in order to reduce the fluorine content of ammonium peroxoniobate containing fluorine in Example 1.

Then, the resulting positive electrode active material (sample) was observed, analyzed, confirmed, and determined in the same manner as in Example 1. The results are shown in Table 1.

Example 4

0.60 g of lithium hydroxide and 0.614 g of lithium fluoride were dissolved in 19.6 g of a Nb hydroxide slurry (containing 9.6 wt % of Nb hydroxide) to prepare a surface treatment liquid.

The surface treatment liquid was dropped into 30 g of a lithium-containing composite oxide ($LiCo_{0.2}Ni_{0.6}Mn_{0.2}O_2$), dried at 120° C. and then, mixed with a ball mill for 20 minutes. A sequence of the operations was repeated three times. Thereafter, it was calcined at 350° C. in the air to obtain a positive electrode active material (sample). The average particle diameter (D50) of the sample determined by a laser diffraction scattering-type particle size distribution measurement method was 5.2 μm.

Then, the resulting positive electrode active material (sample) was observed, analyzed, confirmed, and determined in the same manner as in Example 1. The results are shown in Table 1.

Comparative Example 1

In Example 1, the coating treatment in which the core particles were introduced in the surface treatment liquid was not performed, and the positive electrode active material (sample) was used as it was.

Then, the resulting positive electrode active material (sample) was observed, analyzed, confirmed, and determined in the same manner as in Example 1. The results are shown in Table 1.

[Method for Measuring Various Physical Property Values]

Various physical property values of the positive electrode active material (sample) obtained in each of Examples and Comparative Example were measured as follows.

<Chemical Analysis>

The positive electrode active material (sample) obtained in each of Examples and Comparative Example was completely dissolved with hydrochloric acid and hydrofluoric acid, and the content (wt %) of the Nb element was measured by inductively coupled plasma (ICP) emission spectroscopy.

<Analysis of Fluorine Amount>

The positive electrode active material (sample) obtained in each of Examples and Comparative Example was thermally decomposed with oxygen and water vapor flow, and fluorine of the sample was collected in a hydrogen peroxide solution to prepare a sample solution. Thereafter, the sample solution was measured by ion chromatography, and fluorine ions were quantified to measure the fluorine amount.

The measurement was performed at 35° C. by using an ICS-2100, manufactured by Thermo Fisher Scientific K.K. as a measurement apparatus, Ion Pac AS19 as a column, and potassium hydroxide as a carrier liquid (eluent).

The mass ratio of the fluorine amount (ppm) with respect to the positive electrode active material (sample) was thus determined, and "F/Nb ($\times 10^{-4}$)" was calculated as the mass ratio of the fluorine amount (ppm) obtained by ion chromatography with respect to the content (wt %) of the Nb element obtained by ICP. The results are shown in Table 1. Here, the above measurement conditions can apply to halogens other than fluorine.

<Surface Analysis by XPS>

The particle surface of the positive electrode active material (sample) obtained in each of Examples and Comparative Example was analyzed using a QUANTUM 2000 that was an XPS apparatus manufactured by Ulvac-Phi, Inc. The conditions used for the measurement were as follows.

Excitation X-ray: monomer Al-Kα ray (1,486.6 eV)

Output: 100 W

Acceleration voltage: 20 kV

X-ray irradiation diameter: 100 μmφ

Measurement area: 100 μmɸ×1 mm
Pass energy: 23.5 eV
Energy step: 0.1 eV

The XPS data was analyzed using data analysis software ("Multipack Ver. 9.0", manufactured by Ulvac-Phi, Inc.).

Iterated Shirley was used as a background mode.

The analysis was performed by taking the interferences of the Ni LMM peak and Mn LMM peak into consideration, and the orbit to be used for the calculation was determined for each element as described below.

Li: 1s
Ni: 2p1
Nb: 3d
Mn: 2p1
Ti: 2p3
C: 1s
O: 1s
F: 1s
N: 1s

More specifically, the surface of the positive electrode active material (sample) obtained in each of Examples and Comparative Example was analyzed using XPS under the above conditions; and the ratio ((F/Nb)×100) of semi-quantitative of F with respect to semi-quantitative of Nb and the ratio (Li/Nb) of semi-quantitative of Li with respect to semi-quantitative of Nb were determined from the obtained X-ray photoelectron spectroscopy spectrum.

<Surface Analysis by TOF-SIMS>

By using a TRIFT IV that was a time-of-flight secondary ion mass spectroscopy (TOF-SIMS) apparatus manufactured by Ulvac-Phi, Inc., the particle surface of the positive electrode active material (sample) obtained in each of Examples and Comparative Example was analyzed, and the concentration of halogen present on the sample surface was measured. Specifically, the ratio (F$^-$/total) of count numbers (F$^-$) of fluorine ions with respect to the sum (total) of all count numbers of secondary ions collected from the sample surface, as measured under the condition of negative secondary ion polarity, was measured.

The conditions used for the measurement are as follows.
Primary ion: Au$^+$
Acceleration voltage: 30 kV
Measurement area: 10,000 μm$^2$ (100 μm×100 μm)
Unit of measurement time: 10 minutes
Measurement ion species: Positive/Negative
Electron neutralization: performed <Observation of Halo Pattern by Selected Area Electron Diffraction>

By using a scanning-type transmission electron microscope (STEM, JEM-ARM200F, manufactured by JEOL Ltd.), an electron diffraction was acquired from an area of about 100 nm in diameter under the conditions where the acceleration voltage was 200 kV and the selected area aperture size was 10 μm, to thereby observe the presence or absence of the halo pattern.

When the halo pattern is observed, it can be confirmed that the compound present on the surface of the positive electrode active material (sample) obtained in each of Examples and Comparative Example is an amorphous compound.

<Production and Evaluation of All-Solid-State Lithium Secondary Battery>

An all-solid-state lithium secondary battery was produced by using the positive electrode active material (sample) obtained in each of Examples and Comparative Example and the solid electrolyte, and the battery characteristics were evaluated (evaluations of rate characteristics and cycle characteristics).

(Material)

The positive electrode active material (sample) produced in each of Examples and Comparative Example was used as the positive electrode active material, a graphite (Gr) powder was used as the negative electrode active material, and a powder represented by a compositional formula: $Li_{5.8}PS_{4.8}Cl_{1.2}$ was used as the solid electrolyte powder.

The positive electrode active material (sample) produced in each of Examples and Comparative Example, the solid electrolyte powder, and a conductive material (acetylene black) powder were mixed in a ratio of 60:37:3 by using a mortar, to thereby prepare a positive electrode mixture powder.

(Production of All-Solid-State Lithium Secondary Battery)

14.5 mg of the positive electrode mixture powder was filled in an insulated tube (ɸ9 mm) for sealed-type cell, and molded uniaxially at 500 MPa to produce a positive electrode mixture powder pellet. The resulting positive electrode pellet was moved to an insulated tube (ɸ10.5 mm) for sealed-type cell, and 100 mg of the solid electrolyte powder was filled onto the positive electrode pellet. Next, the solid electrolyte powder together with the positive electrode mixture pellet was molded uniaxially at 184 MPa. Thereafter, 18 mg of a graphite (Gr) powder was filled onto the solid electrolyte. They were molded uniaxially at 551 MPa, and were fastened with pressuring screws to produce an all-solid-state lithium secondary battery.

(Evaluation of Battery Characteristics)

The battery characteristics were evaluated by placing the all-solid-state lithium secondary battery cell in an environmental testing chamber maintained at 25° C. and connecting the cell to a charging and discharging measurement apparatus. At this time, the charging was performed in a CC-CV mode at the upper limit voltage of 4.5 V, and the discharging was performed in a CC mode at the lower limit voltage of 2.5 V.

The charging and the discharging were repeated at 0.1 C from the first cycle to the third cycle; at the 4th cycle, the charging was performed at 0.2 C and the discharging was performed at 2.0 C; and from the 5th cycle to the 51st cycle, the charging and the discharging were repeated at 0.1 C.

The value of the rate characteristics is indicated by the quotient obtained by dividing the discharging capacity at the 4th cycle by the discharging capacity at the second cycle, and the value of the cycle characteristics is indicated by the quotient obtained by dividing the discharging capacity at the 51st cycle by the discharging capacity at the second cycle. The results are shown in Table 1.

(Initial Charge and Discharge Efficiency)

Also, the value of the initial charge and discharge efficiency is indicated by the quotient obtained by dividing the discharging capacity at the first cycle by the charging capacity at the first cycle.

TABLE 1

| Evaluation Item | Analysis Method | Unit | Example 1 | Example 2 | Example 3 | Example 4 | Comparative Example 1 |
|---|---|---|---|---|---|---|---|
| LiNbO Compound Surface Layer | STEM & XPS | — | Present | Present | Present | Present | Not present |
| Crystallinity of LiNbO Compound | STEM | — | Amorphous | Amorphous | Amorphous | Amorphous | — |
| F/Nb ($\times 10^{-4}$) | Ion Chromatography/ICP | — | 447.7 | 134.9 | 4.9 | 2866.0 | — |
| F—/total | TOF-SIMS | — | 0.031 | 0.025 | 0.015 | 0.025 | — |
| F/Nb ($\times 100$) | XPS | — | 39 | 30 | 11 | 16 | — |
| Li/Nb | XPS | — | 5.5 | 7.3 | 7.1 | 1.8 | — |
| Initial Charge and Discharge Efficiency | Battery Characteristics Evaluation | % | 78 | 77 | 76 | 84 | 74 |
| Rate Characteristics 2C/0.1 C. Capacity Retention Rate @25° C. | Battery Characteristics Evaluation | % | 70 | 66 | 63 | 72 | 60 |
| Cycle Characteristics 50 cycle Capacity Retention Rate @25° C. | Battery Characteristics Evaluation | % | 77 | 75 | 73 | 90 | 68 |

(Consideration)

From the results of Examples and tests which have been so far conducted, it is found that the rate characteristics can be enhanced by reducing the interfacial resistance when the surface of the lithium-containing composite oxide (present core particles) is coated with the LiAO compound (A represented one or more elements selected from the group consisting of Ti, Zr, Ta, Nb, Zn, W, and Al).

Furthermore, it is also found that, by the presence of a halogen on the surface of the present core particles, even when used in combination with a sulfide-based solid electrolyte, the initial charge and discharge efficiency and the cycle characteristics can be enhanced by the halogen present on the surface of the present core particles which is able to compensate for oxygen on the surface region and to suppress the exchange reaction between oxygen (O) in the LiAO compound or in the positive electrode active material core particles and sulfur (S) in the sulfide-based solid electrolyte.

Observing the surface of the positive electrode active material (sample) obtained in each of Examples 1 to 4, it is confirmed that the aggregated LiAO compound particles were present on the surface of the present core particles with a thickness of 1 to 25 nm, which meant forming a layer. However, the entire surface of the present core particles was not coated with the LiAO compound, and the surface of the present core particles was partly exposed.

From the results of Examples and tests which have been so far conducted, it can be considered that the desirable effect could be readily obtained when the LiAO compound coated 30% or more of the entire surface area of the present core particles.

It is also confirmed that, in regard to the positive electrode active material (sample) obtained in each of Examples 1 to 4, the amount of lithium carbonate present on the surface of the present core particles was measured, and the result was respectively less than 2.5 wt % of the positive electrode active material.

As for the structure where the LiAO compound is coated on the surface of the present core particles in each of Examples, only Nb is used as the A element in Examples, but Nb and Ti, Zr, Ta, Zn, W, and Al are common in that they are valve metals, and it can be considered that the same effect can be obtained.

Also, in each of Examples, only the effect when fluorine (F) is present on the surface of the present core particles is shown. However, since halogens other than fluorine (F) also have a large first ionization energy and becomes a monovalent anion similar to fluorine (F), it can be presumed that halogens other than fluorine also exhibit the function of the oxygen compensation by fluorine (F) on the surface region of the present core particles and the function of suppressing the exchange reaction between oxygen (O) in the LiAO compound and sulfur (S) in the sulfide-based solid electrolyte, and the effect similar to fluorine (F) can be also obtained.

Furthermore, in each of Examples, only the effect when the present core particles are composed of the lithium-containing composite oxide having a layered rock salt structure, is shown. However, the effect in which a satisfactory interface can be constructed and the battery capacity can be increased by forming a lithium ion conducting oxide layer such as $LiNbO_3$ on the surface of the positive electrode active material and by interposing the lithium ion conducting oxide layer between the positive electrode active material and the solid electrolyte is a common effect to other lithium-containing composite oxides. In addition, the problem in which, when a sulfide-based solid electrolyte containing sulfur (S) is used as the solid electrolyte, the exchange reaction between oxygen (O) in the lithium ion conducting oxide layer such as $LiNbO_3$ or in the positive electrode active material core particles and sulfur (S) in the sulfide-based solid electrolyte is generated to deteriorate the interface, and the battery characteristics such as rate characteristics and cycle characteristics are decreased, is a common problem to other lithium-containing composite oxides. Therefore, it can be presumed that, in addition to the lithium-containing composite oxide having a layered rock salt structure, the same effect as in each of Examples can be obtained in a lithium-containing composite oxide having a spinel structure, a lithium-containing composite oxide having an olivine structure, and the like.

The invention claimed is:

1. A positive electrode active material for an all-solid-state lithium secondary battery comprising core particles comprising a lithium-containing composite oxide, wherein the core particles are coated with a coating compound containing Li; A, where A represents one or two or more elements selected from the group consisting of Ti, Zr, Ta, Nb, Zn, W, and Al; and O, a halogen is present on the surface of the core particles, and the halogen is solid-dissolved in the coating compound.

2. The positive electrode active material according to claim 1, wherein a ratio, Ha$^-$/total, of count numbers, Ha$^-$, of secondary ion species for halogen ions with respect to the sum, total, of all count numbers of secondary ions collected from the surface of the core particles, as measured under the condition of negative secondary ion polarity using time-of-flight secondary ion mass spectroscopy (TOF-SIMS), is 0.00075 or more.

3. The positive electrode active material according to claim 1, wherein a mass ratio, Ha/B, of a halogen amount, Ha in ppm, measured by ion chromatography after thermally decomposing the positive electrode active material with respect to an A element amount, B in wt %, measured by inductively coupled plasma (ICP) emission spectroscopy after completely dissolving the positive electrode active material is $0.5 \times 10^{-4}$ or more.

4. The positive electrode active material according to claim 1, wherein a molar ratio, Ha/C×100, of the halogen, Ha, amount with respect to an A element amount, C, present on the surface of the core particles, as measured by X-ray photoelectron spectroscopy (XPS), is 1.1 or more.

5. The positive electrode active material according to claim 1, wherein the halogen is fluorine (F).

6. The positive electrode active material according to claim 1, wherein a molar ratio, Li/D, of a Li element amount with respect to the A element amount, D, present on the surface of the present core particles, as measured by X-ray photoelectron spectroscopy (XPS), is 1.5 to 33.3.

7. The positive electrode active material according to claim 1, wherein the lithium-containing composite oxide is a lithium-containing composite oxide having a layered rock-salt structure, which is represented by a general formula: $LiMO_2$, where M represents a metal element.

8. The positive electrode active material according to claim 1, wherein the coating compound is an amorphous compound.

9. An all-solid-state lithium secondary battery, comprising the positive electrode active material according to claim 1, a solid electrolyte, and a negative electrode active material.

10. The all-solid-state lithium secondary battery according to claim 9, wherein the solid electrolyte is a sulfide-based solid electrolyte containing sulfur (S).

11. The positive electrode active material according to claim 2, wherein a mass ratio, Ha/E, of a halogen amount, Ha in ppm measured by ion chromatography after thermally decomposing the positive electrode active material with respect to an A element amount, E in wt %, measured by inductively coupled plasma (ICP) emission spectroscopy after completely dissolving the positive electrode active material is $0.5 \times 10^{-4}$ or more.

12. The positive electrode active material according to claim 2, wherein a molar ratio, Ha/C×100, of the halogen, Ha, amount with respect to an A element amount, C, present on the surface of the core particles, as measured by X-ray photoelectron spectroscopy (XPS), is 1.1 or more.

13. The positive electrode active material according to claim 3, wherein a molar ratio, Ha/C×100, of the halogen, Ha, amount with respect to an A element amount, C, present on the surface of the core particles, as measured by X-ray photoelectron spectroscopy (XPS), is 1.1 or more.

14. The positive electrode active material for an all-solid-state lithium secondary battery according to claim 1, the coating compound is represented by $Li_xAO_y$, where x satisfies 1<x and y ranges according to the valences of the elements.

* * * * *